March 3, 1964  R. J. FRASE  3,123,030
PLANTER DRIVES

Filed Dec. 18, 1961  2 Sheets-Sheet 1

INVENTOR
ROLAND J. FRASE

Paul O. Pippel
ATTORNEY

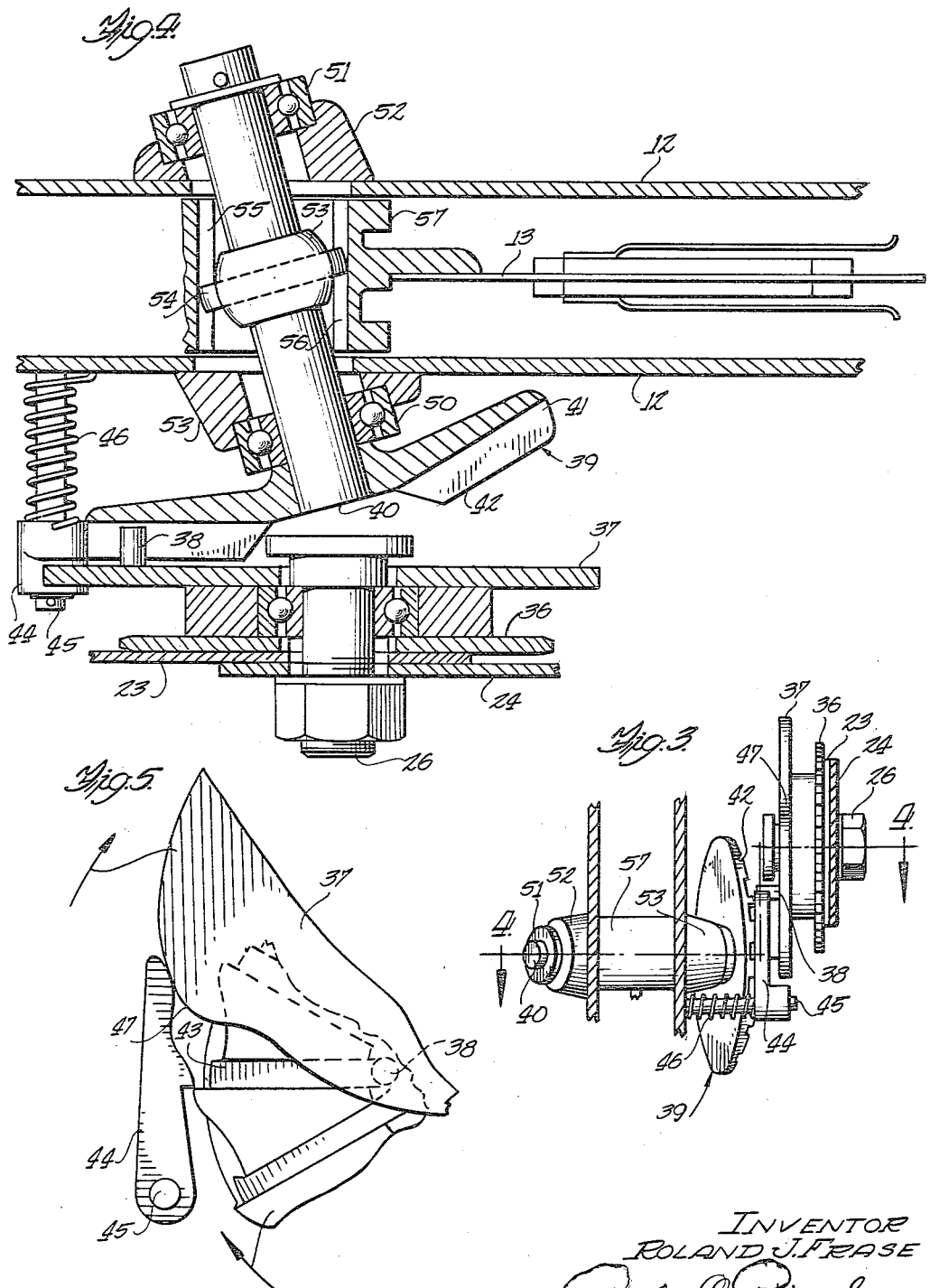

United States Patent Office 3,123,030
Patented Mar. 3, 1964

3,123,030
PLANTER DRIVES
Roland J. Frase, Chicago, Ill., assignor to International Harvester Company, Chicago, Ill., a corporation of New Jersey
Filed Dec. 18, 1961, Ser. No. 159,872
5 Claims. (Cl. 111—34)

This invention relates generally to agricultural implements, and more particularly to an intermittent planter drive.

In the seed planter art, it has been the general practice to employ a rotatable seed wheel having a plurality of seed cells around the outer periphery, which cooperate with a seed hopper to receive the seeds by gravity from the hopper, and to then deposit the seeds into the ground. While such devices have in general served the purpose, they have not proved entirely satisfactory, since the ground speed at which the planter unit is operated is limited by the rate at which the seeds fall by gravity into the seed cells. The general purpose of the present invention is therefore, to provide a planter unit which embraces all of the advantages of the prior art devices, while having an improved seed wheel drive means, which allows the planter unit to be operated at higher ground speeds.

A more specific object of the present invention is to provide a planter unit of the type hereinafter described with means for accelerating the rotation of the seed wheel during the seed depositing part of the cycle, thus allowing the seed wheel to be at rest during a larger portion of the cycle to thereby improve cell fill.

Another object of the invention is the provision of means which allow the seed plate to be rotated in the same direction as the driving elements, and in a plane parallel to the plane of the driving elements.

Another object of the invention is to provide means which transmit rotary motion to a hub having a rotating shaft angularly disposed within the bore of said hub.

Other objects and advantages of the invention will hereinafter become more fully apparent from the following description of the annexed drawings, which illustrate a preferred embodiment of the invention, and wherein:

FIGURE 3 is an end elevational view of the construction set forth in FIGURE 2;

FIGURE 4 is a cross-sectional view on an enlarged scale taken along line 4—4 in FIGURE 3; and FIGURE 5 is a side elevational view of a portion of the apparatus showing the follower member in an unlocked position.

Figure 1:
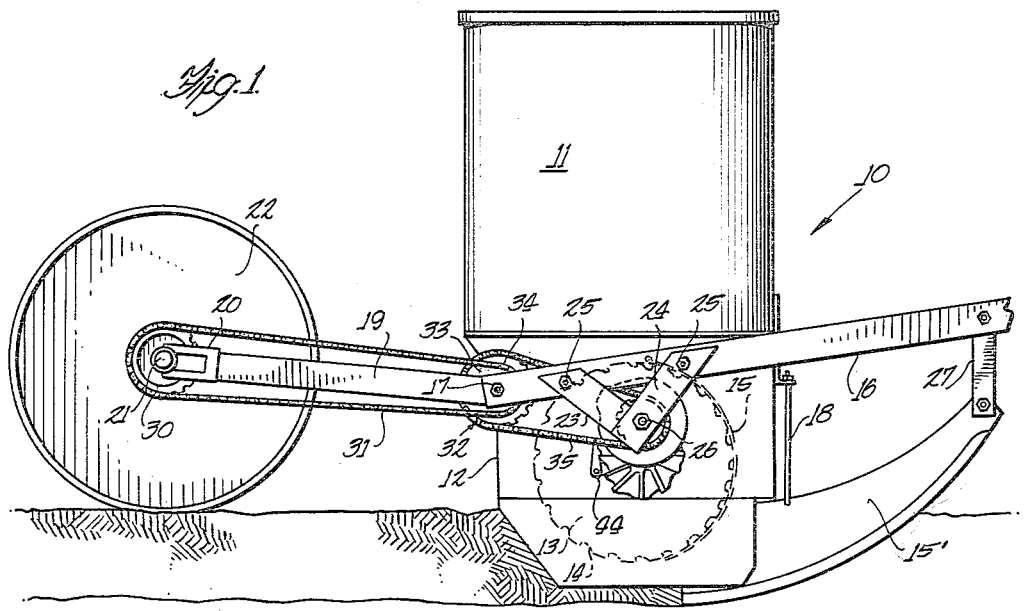
FIGURE 1 is a side elevational view of a planter unit embodying the present invention.
Figure 2:
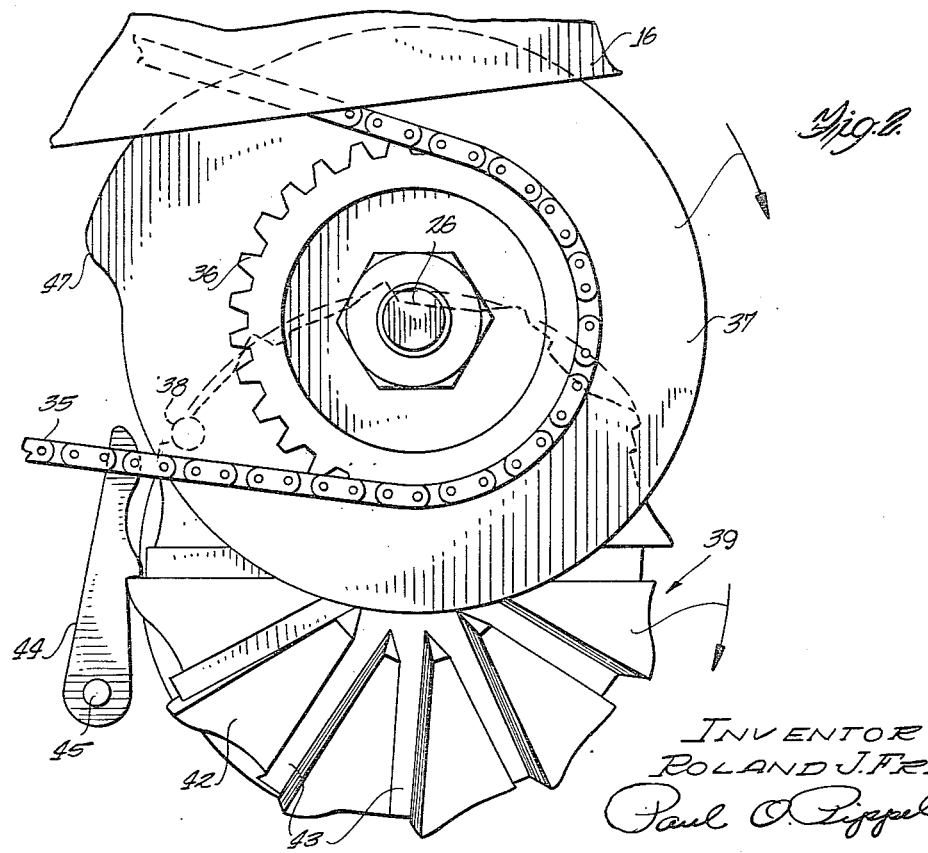
FIGURE 2 is an enlarged side elevational view of the seed plate drive mechanism.

Referring now to the drawings, wherein like reference characters designate like or corresponding parts throughout the several views, there is shown in FIGURE 1 a planter unit indicated in its entirety by reference numeral 10. Planter unit 10 includes a seed hopper or dispenser 11 mounted on the planter unit frame, and having a chute portion 12 adapted to guide the seed into the ground. Seed wheel 13 is mounted for rotation in chute portion 12, and contains a plurality of peripherally located seed cells 14. The seeds fall by gravity into the seed cells 14, and are maintained in seed cells 14 by a leaf spring 15 or equivalent structure, until the seed plate 13 rotates into position to deposit the seed into the ground. A furrow opener 15 is mounted on the planter unit frame to prepare a furrow for reception of the seeds.

The planter unit frame includes a pair of generally fore and aft extending drag links 16 adapted to be connected at their forward end to a tractor, not shown, and having their rearwardly extending end joined by a transversely extending shaft 17. A pair of downwardly extending arms 27 are secured to an intermediate portion of drag links 16, and support the forward end of furrow opener 15. Additional support for furrow opener 15 is provided by bracket means 18, which depend from seed hopper 11. The planter unit frame means further comprises a pair of generally fore and aft extending arm members 19 joined at one end to transversely extending shaft member 17, and secured at the opposite end to bracket members 20. Bracket members 20 are mounted on the transversely extending axis 21 of press wheel 22. A pair of depending bracket members 23 and 24 are removably mounted on one of drag links 16, as by bolts 25 or the like, and are secured at their lower ends by bolt assembly 26.

The drive for seed wheel 13 includes a first sprocket 30 fixedly secured to press wheel axle 21, and having an endless chain 31 trained thereover. A double sprocket 32 is fixedly secured to shaft 17, and includes a driven section 33 of smaller diameter engageable with endless chain 31, and a driver section 34 of larger diameter engageable with endless chain 35. Endless chain 35 cooperates with sprocket 36 mounted on bolt member 26 to continuously rotate actuating wheel 37.

An actuating pin 38 is secured to the face portion of wheel member 37, and is adapted to intermittently drive a bevel gear follower member 39 as will become hereinafter more apparent. Follower member 39 includes a shaft portion 40 and a face portion 41 inclined with respect to shaft portion 40. Face section 41 is provided with a plurality of upraised portions or teeth 42 separated by a plurality of radially extending slots or grooves 43. While follower member 39 has been illustrated as a bevel gear in the preferred embodiment, it should be understood that any member having a plurality of radially extending slots would adequately serve the purpose.

A pawl 44 is mounted for pivotal movement on a shaft 45, which extends outwardly from chute section 12. Pawl 44 is resiliently urged into engagement with portion 42 of follower member 39 by spring 46, to lock follower member 39 against rotation. A camming surface 47 is provided on actuating wheel 37 and is engageable with pawl 44 to release follower member 39 for rotation. As best seen in FIGURE 5, when cam area 47 engages pawl 44, actuating pin 38 enters one of the slots 43 near the center of follower member 39. As actuating wheel 37 rotates, pin 38 will slide radially outwardly along slot 43, accelerating follower member 39 from an initial at rest position to the desired velocity. When pin 38 passes through the end of slot 43 spring member 46 will re-engage pawl 44 with follower member 39 to prevent further rotation. Since face 41 is inclined with respect to shaft 40, and the axis of rotation of shaft 40 is offset from the axis of rotation of actuating wheel 37, a pin 38 will make one complete revolution before it again engages another slot 43 adjacent the center of follower member 39.

Shaft 40 is mounted for rotation in chute section 12 by bearing assemblies 50 and 51 provided in outwardly extending boss members 52 and 53. A substantially spherical collar 53 is secured to shaft 40 by a transversely extending pin member 54. The end portions of pin member 54 engage a pair of slots 55 and 56 which are provided in hub section 57, to transmit the intermittent rotary motion of shaft 40 to the seed wheel 13.

It should be understood that follower member 39, and consequently seed wheel 13, are locked against rotation during a large period of the cycle of rotation of actuating wheel 37, thereby allowing a substantially long period for seed to flow into seed cells 14. It should also be apparent that because of the acceleration of seed plate 13, the planter unit lends itself to high speed planting.

The foregoing disclosure relates to only a preferred embodiment of the invention, and numerous modifications or alterations may be made therein without departing from the spirit and scope of the invention as set forth in the appended claims.

What is claimed is:

1. In a planter or the like having frame means, a seed hopper mounted on said frame means, and a seed dispensing wheel rotatably mounted on the frame means adjacent said hopper, an intermittent drive for said seed wheel comprising an actuating wheel mounted for continuous rotation on said frame means, means on the frame means operatively connected to said actuating wheel for driving the latter, an actuating pin projecting outwardly from said actuating wheel, a follower member rotatably mounted on the frame means and drivingly associated with said seed wheel, said follower member having a face portion thereon provided with a plurality of radially extending surface grooves, said actuating pin being positioned to be slidingly intermittently engageable with said grooves and to slide from a position near the center of the follower member radially outwardly along said grooves to accelerate said follower member from an initial at rest position to the desired velocity, and means mounted on the frame means and operatively engageable with the follower member for locking said follower member against rotation during periods of non-engagement with said actuating pin.

2. In a planter or the like having frame means, a seed hopper mounted on said frame means, and a seed dispensing wheel rotatably mounted on the frame means adjacent said hopper, an intermittent drive for said seed wheel comprising an actuating wheel mounted for continuous rotation on said frame means, means on the frame means operatively connected to said wheel for driving the latter, an actuating pin projecting outwardly from said actuating wheel, a follower member rotatably mounted on the frame means and drivingly associated with said seed wheel, said follower member having a face portion thereon provided with a plurality of radially extending surface grooves, said actuating pin being positioned to be slidingly intermittently engageable with said grooves and to slide from a position near the center of the follower member radially outwardly along said grooves to accelerate said follower member from an initial at rest position to the desired velocity, means mounted on the frame means and operatively engageable with the follower member for locking said follower member against rotation during periods of non-engagement with said actuating pin, and means on said actuating wheel engageable with said locking means to free said follower member for rotation with said actuating member as said actuating pin engages one of said grooves.

3. In a planter or the like having frame means, a seed hopper mounted on said frame means, and a seed dispensing wheel rotatably mounted on the frame means adjacent said hopper, an intermittent drive for said seed wheel comprising an actuating wheel mounted for continuous rotation on said frame means, means on the frame means operatively connected to said actuating wheel for driving the latter, an actuating pin projecting outwardly from said actuating wheel, a follower member rotatably mounted on the frame means and drivingly associated with said seed wheel, said follower member having a face portion thereon provided with a plurality of radially extending surface grooves, said actuating pin being positioned to be slidingly intermittently engageable with said grooves and to slide from a position near the center of the follower member radially outwardly along said grooves to accelerate said follower member from an initial at rest position to the desired velocity, means mounted on the frame means and operatively engageable with the follower member for locking said follower member against rotation during periods of non-engagement with said actuating pin, means on said actuating wheel engageable with said locking means to free said follower member for rotation with said actuating member as said actuating pin engages one of said grooves, and spring means urging said locking means into re-engagement with said follower member to retain the follower member in the at rest position when the actuating pin has slid through the groove.

4. In a planter or the like having frame means, a seed hopper mounted on said frame means, and a seed dispensing wheel rotatably mounted on the frame means adjacent said hopper, an intermittent drive for said seed wheel comprising an actuating wheel mounted for continuous rotation on said frame means, means on the frame means operatively connected to said actuating wheel for driving the latter, an actuating pin projecting outwardly from said actuating wheel, a follower member mounted on the frame means and having a rotatable shaft portion and a face portion inclined with respect to said shaft portion, said face portion having a plurality of radially extending grooves slidingly engageable with said actuating pin, the axis of said shaft portion being disposed at an angle with respect to the rotational axis of said actuating wheel, said shaft axis being displaced from said actuating wheel axis to allow said actuating pin to intermittently engage said grooves, means carried by the frame means and operatively engageable with the follower member for normally locking said follower member against rotation, means on said actuating wheel engageable with said locking means to free said follower member for rotation with said actuating wheel when said actuating pin engages a groove, and means connecting said shaft portion with said seed wheel for intermittent rotation thereof.

5. The invention set forth in claim 4 wherein said seed wheel includes a hub having a bore therein, said bore having at least two diametrically opposed grooves extending therealong, and said last mentioned means comprises a sleeve member mounted on said shaft, and a pin member extending through said sleeve and said shaft and having its end portions engageable with said grooves to constrain said seed wheel for intermittent rotation with said shaft.

References Cited in the file of this patent

UNITED STATES PATENTS

| | | |
|---|---|---|
| 966,976 | Zahn | Aug. 9, 1910 |
| 985,382 | Walter | Feb. 28, 1911 |
| 986,872 | Sundvall | Mar. 14, 1911 |
| 1,163,789 | Stevens | Dec. 14, 1915 |
| 2,145,942 | McAdams | Feb. 7, 1939 |
| 2,307,176 | Witte | Jan. 5, 1943 |
| 2,854,933 | Kuester | Oct. 7, 1958 |

FOREIGN PATENTS

| | | |
|---|---|---|
| 309,145 | Great Britain | 1930 |